United States Patent [19]

Oberdorfer-Bögel

[11] Patent Number: 4,911,481

[45] Date of Patent: Mar. 27, 1990

[54] HIGH PRESSURE PRESS-IN FITTING

[76] Inventor: Rainer Oberdorfer-Bögel, Mozartstr, 9, Kirchberg/Iller, Fed. Rep. of Germany, 7959

[21] Appl. No.: 221,713

[22] Filed: Jul. 20, 1988

[30] Foreign Application Priority Data

Jul. 20, 1987 [DE] Fed. Rep. of Germany ....... 8709953

[51] Int. Cl.[4] .............................................. F16L 41/00

[52] U.S. Cl. .................................... 285/116; 285/189; 285/242; 138/44

[58] Field of Search ............... 285/190, 242, 250, 116, 285/189; 138/44

[56] References Cited

U.S. PATENT DOCUMENTS

| | | | |
|---|---|---|---|
| 1,802,766 | 4/1931 | Kerr | 138/44 |
| 4,323,269 | 4/1982 | Pellenc | 285/190 X |
| 4,426,213 | 1/1984 | Stavropoulos | 138/44 X |
| 4,662,401 | 5/1987 | Zingg et al. | 138/44 X |
| 4,679,829 | 7/1987 | Yanagisawa | 285/190 |

FOREIGN PATENT DOCUMENTS

| | | | |
|---|---|---|---|
| 791011 | 7/1968 | Canada | 285/250 |

*Primary Examiner*—Thomas F. Callaghan
*Attorney, Agent, or Firm*—Brown, Martin, Haller & McClain

[57] ABSTRACT

A high-pressure press-in fitting for a high-pressure hose connection with a quick connect screwed joint at the outside of a high-pressure purifying installation, characterized in that the press-in fitting of the quick-connect coupling, receiving the end of the hose on the side of the appliance and designed as a plug-in coupling, has in the flow-through area a molded-in verturi insert and is provided on the front end with a peripheral groove which communicates witha chemical additives-feeding cross bored hose coupling at the side of the appliance aligned with the annular groove, whereby there is communicating connection between the flow-through area and the cross-bore.

4 Claims, 1 Drawing Sheet

HIGH PRESSURE PRESS-IN FITTING

The invention relates to a high pressure, press-in fitting or nozzle for a high pressure hose connection with a quick-connect coupling on the outside of a high pressure purifying appliance.

Starting from a high pressure purifying appliance of a known design, with arranged on the outside chemical injector throttle units for adding chemicals or other additives into the pump stream, the present invention has the object to circumvent the throttle units that hinder the ventilation of the units. This requirement exists especially when a pump must work from a water box or similar device and must draw without pressure and against the resistance of the throttle unit.

In the device according to the invention, the end of the hose, placed at the receiving side of the appliance and as a plug-in connection part having a press-in fitting of the quick-connect coupling type, has in the flow-through area a molded-in venturi insert and is formed with a ring groove, molded around the outer periphery at the front end and aligned in interlocked state with a chemical additives admitting cross bore of the socket of the hose connection at the side of the appliance, with the cross bore fitting communicating with the flow-through area of the fitting.

This invention offers the advantage that, by means of the quick-connect coupling, the high pressure hose adjacent to the outside of the appliance, including the throttle section, is simply separated from the appliance, and the full flow-through profile can be opened so that the pump can develop a considerably better suction effect.

In the special development of the press-in fitting it is further foreseen for this purpose that the inlet cone of the venturi insert is seated frontally on the press-in fitting, and the ring groove is arranged upstream of a second groove, receiving the O-ring sealing the coupling, as well it is distanced from the front side of the press-in fitting so that the cross bore opens into the outflow cone of the venturi insert.

In order to enable to manipulate without resistance the quick-connect coupling when the admission line for the additives opens immediately adjacent to the hose coupling, a connecting nut is attached to the press-in fitting actuating the quick-connect coupling, overlapping the press sleeve of the hose nipple and rotatingly supported on it, for engagement between a male thread of the connecting sleeve at the side of the appliance, nd a handle having a female thread, as well as being molded-on, encompassing and connected to the sleeve on the side of the appliance, whereby the central bore of the connecting nut is dimensioned for a stopping engagement with the inward angularly designed front molded-in ring groove on the press-in fitting and the thread has a front side abutment face for setting against an annular shoulder also molded into the press-in fitting.

The thread part of the connecting nut can consist in this case of a suitable metal and the handle part, designed as a guard ring, is of a suitable plastic.

The embodiment of the connecting nut with a female thread meshing with the connecting sleeve at the side of the appliance, has the advantage that the cross bore for the admission of chemical additive which is received for the press-in fitting hose connecting sleeves can be assembled outside the area of the connection encompassing the handle part of the connecting nut and can receive outside the wall of the connecting sleeve an attached hose nipple encompassing the admission hose.

With this press-in fitting according to the invention, it is also important that the press-in fitting, developed as plug-in connecting part and integrated with the venturi insert, can be designed in one piece with a seated hose nipple for the high pressure hose leading to the spray gun.

With this special, simple quick-connect coupling and the related press-in fitting, it is possible to attach immediately, without an injector built separately outside of the purifying device or a built-in injector in the appliance, optional combinations at the outside of the appliance, which can be a chemical supply injector or the like which has the press-in fitting according to the invention for the quick-connect coupling. It is also possible to simply connect directly a high pressure hose, i.e. without such a fitting, in case that additives are not needed.

Further features are shown in the following description disclosing a preferred form of embodiment of the invention in accordance with the attached drawings. In the drawings illustrated are in:

Figure 3:
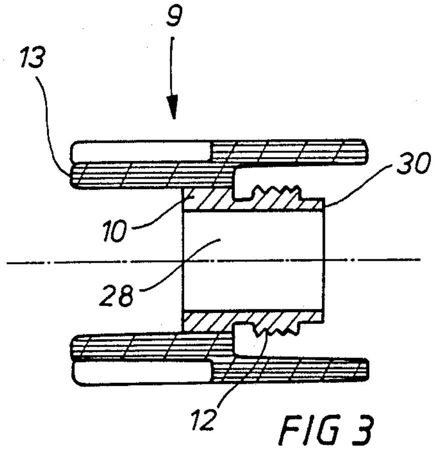
Figure 3A:
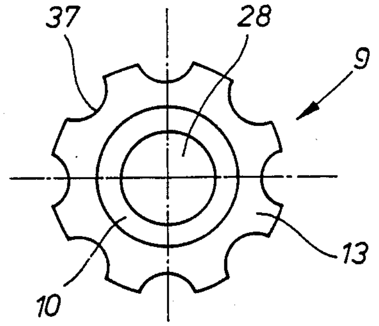

FIGS. 3 and **3*a*** are, respectively, a sectioned and front view of the connecting.

Figure 1:
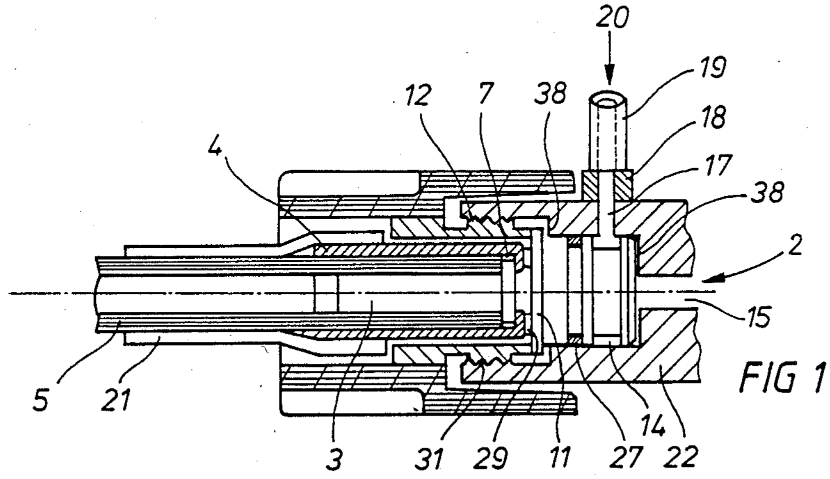
FIG. 1 is a partly sectioned side view showing the press-in fitting coupled to the connection on the side of the appliance.

FIG. 1 shows a preferred form of embodiment of the press-in fitting 1 with a quick-connect coupling introduced into the connecting sleeve 22 located on the side of the appliance, abutting against it. FIGS. 1 and 3 show in enlarged illustration the press-in fitting 1, and the connecting or coupling ring 9, respectively.

As shown in FIG. 1, the connecting sleeve 22, shown as an example, receives the fitting 1 in its bore 15. In this preferred form of embodiment, the connecting sleeve 22 has an inner female thread 31 disposed at the front end of it which meshes with an outer male thread 12 on the connection nut 9.

FIG. 1 of the drawing illustrates the apparatus for the additives to be added, disposed above the connection sleeve 22 as indicated by the arrow 20. The wall of the connection sleeve 22 shows here a cross bore 17 with a nipple 18 on the outside above which the corresponding connection hose 19 is located.

Figure 2:
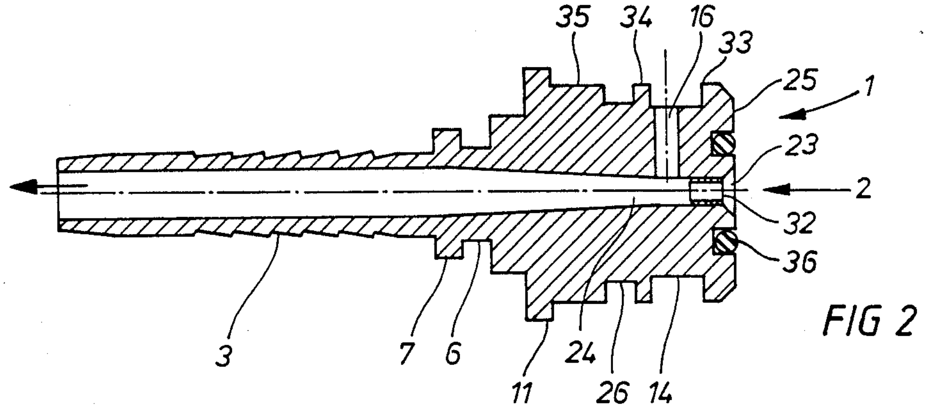
FIG. 2 is a side sectioned view showing the press-in fitting.

As is shown in the enlarged illustration of the press-in fitting 1 in FIG. 2, the venturi insert 2 is completely enclosed in the fitting 1. The admission cone 23, disposed downstream directly against the front side 25 of the fitting 1, is followed by the insert 32 and the outlet cone 24. As shown further in FIG. 2, the front area 25 has an annular groove 36 for an attached O-ring (not shown) that seals against annular abutment face 38 of the connection sleeve 22 at the outside of the appliance.

Next to the abutment face of the fitting 1 forming front side 25, a first groove or ring groove 14 is provided on the periphery and is communicatingly connected, on the one hand, through a ross bore 16, with outlet cone 24 of the venturi insert 2 and, on the other hand, through a cross bore 17 in the wall of the connection sleeve 22 on the side of the appliance, with the admission line 19 for additives to be added when the fitting 1 is introduced into the connection sleeve 22 (FIG. 1). Then, next to the ring groove 14, toward the hose nipple 3, a second groove or ring groove 26 for an O-ring 27 is placed to seal the ring groove 14, and attached thereto is a cylindrical guide face 35 with an annular shoulder 11, which abuts at its rear side the front side or annular front face 30 of the connection nut 9 (FIG. 3).

The hose nipple 3, formed in one piece, has around its periphery a conventional profile for reception of the high pressure hose 5. As shown in FIG. 1, the high pressure hose 5 is mounted on the fitting 1 as far as molded ring shoulder 7, and secured by means of a press sleeve 4 on the hose nipple 3, with the press sleeve 4 engaging with its inwardly angled front end 29 a further groove or ring groove 6 and is kept in this position by the connecting- or sleeve nut 9 encompassing the press sleeve 4. Furthermore, around the high pressure hose 5 is attached a known anti-kink sleeve 21 having toward the fitting 1 annual means for its attachment to the press sleeve 4.

For the screw attachment of fitting 1 with connection sleeve 22 of the appliance, there is provided the already mentioned connection nut 9 that, as shown in FIGS. 1 and 3, consists of a threaded part 10 which is enclosed in handle part 13. The threaded part 10 and he handle part 13 can be made in one piece or also combined of different materials, as shown in the illustrated form of embodiment. The threaded part 10 has a central bore 28 conforming in its dimensioning to the press sleeve 4 on which the connection nut 9 is rotatingly supported. Over a longitudinal area of the threaded part 10 is preferably provided an outer male thread 12 for engagement with the inner female thread 31 of the connection sleeve 22. The handle part 13 is made in one piece with the threaded part 10 or is rigidly connected to it. Grooves 37 are formed over a part of the periphery of the handle part 12 in the rear portion for handling properties. The front area of the handle part 13 is extended and surrounded and spaced apart from the threaded area 12 of part 10. The distance between the outer diameter of the threaded area 12 of the threaded part 10 and the inner diameter of the handle piece 13, the threaded part of which surrounds with a clearance the threaded area of the extension, is selected so that the extension, when the press-in fitting 1 is connected, overlaps the front side area of the connection sleeve 22 on the side of the appliance. The central recess in the rear area of the handle piece 13 contains overlapping anti-kink device 21 in its inner diameter with adequate clearance or distance to the outer diameter of the press sleeve 4.

As is explained above in regard to the preferred form of embodiment of the press-in fitting and as is illustrated in the Figures of the drawing, the plug-in connection portion of fitting with the integrated venturi insert is inserted into the connection sleeve 22 on the side of the appliance and secured to it by means of the connection nut 9, whereby the front side 30 of the threaded part 10 abuts the fitting 1 at the peripheral molded annular shoulder 11, and the fitting 1 presses up to the abutment of its front side 25 against the annular abutment face 38 of the connection sleeve 22 on the side of the appliance. In this position the cross bore 16 of the fitting 1 with its molded-on ring groove 14 which directs the flow out of cone 24 of the venturi insert 2 is aligned exactly with the cross bore 17, passing through the wall of the connection sleeve 22 on the side of the appliance, so that the fitting 1 is aligned with the bore 15 of the connection sleeve 22 and held in register through the annular shoulders 33, 34, 35 molded to the fitting 1, and the O-ring 27 in the ring groove 26 and the O-ring in the front face groove 36 pressed against the abutment face 38 of the connection sleeve 22 seal the entire assembly.

It is naturally also possible to use a sleeve nut with inner female threads and have an outer male thread on the connection sleeve for the quick-connect coupling. Other forms of embodiment of the sealing elements and their arrangement are also possible. However, it is important according to this invention that the hose connection fitting has the venturi insert 2 integrated, so that a very simply produced communicating connection ca be realized between, for example, a chemical additive admitting line and the venturi insert integrated in the plug-in connection fitting, to serve as an injector. The fitting, together with the venturi insert, can be freely separated from the appliance for ventilation of the unit, or for enhancing the suction effect of the pump when, for example, the pump is used in a suction operation, i.e. draws from a receptacle the water level of which lies considerably deeper. In all these cases, it is possible to separate the quick screwing connection and the high pressure hose with the connection piece (fitting) having an integrated venturi insert from the outlet of the appliance.

The throttle 32 of the venturi section 2, arranged according the invention integrated in the hose connection fitting 1, can be very simply exchanged and the inner diameter of the throttle 32 is then adaptable to the insert and the desired mixing proportion.

The front part of the press-in fitting 1 can be extended in the area of the flow-through bore 8 in which the inlet cone 23 is molded, in order to enlarge in this case the inlet diameter. A further O-ring, sealing the press-in fitting against the flow-through bore 8 can thereby be arranged in a groove on the respectively wider annular shoulder. Further forms of design are possible.

I claim:

1. A quick-connect coupling for connecting a high-pressure hose to a high-pressure appliance, comprising:
  a press-in fitting (1) connected to a high-pressure hose (5), containing, within a main bore of said fitting, a venturi pathway (2) comprised of an exchangeable throttle insert (32) and entry (23) and exit (24) cones molded in said fitting to accept said insert;
  a female portion of said coupling attached to said appliance, comprising a connection sleeve (22) containing a main exit port (15) communicating with said main bore of said fitting and a cross-bore (17) communicating with said main bore immediately downstream of said venturi pathway (2) by means of an annular groove (14) and cross-bore (16); and
  a quick-connect device comprising a connection nut (9) rotatingly supported on a press-sleeve (4) clamping said high-pressure hose to a hose nipple (3), said nut composed of (i) a bored cylinder (10) with an outer thread around its surface (12), which meshes with an inner thread (31) of said connection sleeve (22) located on the exterior of said appliance, and abuts said hose nipple at an annular shoulder (11), holding said fitting in place, and (ii) a gripping surface (13) circumscribing said cylinder, which overlaps an anti-kink device (21) rearward and said connection sleeve forward.

2. A quick-connect coupling as described in claim 1, wherein said cross-bore (16) communicating with said main bore downstream of said venturi throttle insert is sealed from (i) the atmosphere by means of an O-ring (27) contained within an annular groove (26) downstream from said cross-bore, and from (ii) said main bore stream, by an O-ring (36) contained in a groove upstream from said venturi insert, circumscribing said entry cone of said main bore at the front face of said fitting.

3. A quick-connect coupling as described in claim 1, wherein said cross-bore (17) in said connection sleeve communicates with a feeder hose (19) affixed over a hose nipple (18) attached to said connection sleeve, thereby permitting withdrawal of liquids from said feeder hose into said main bore by means of a vacuum created by said venturi throttle insert.

4. A quick-connect coupling as described in claim 1, wherein said bored, threaded cylinder of said connection nut is machined from metal, and is overlaid circumferentially with a gripping member constructed of plastic.

* * * * *